United States Patent
Turin et al.

(10) Patent No.: US 10,170,812 B2
(45) Date of Patent: Jan. 1, 2019

(54) ASSEMBLY MODULE COMPRISING ELECTROCHEMICAL CELLS RECEIVED BY LUGS AND CONNECTING CLIPS

(71) Applicant: COMMISSARIAT A L'ENERGIE ATOMIQUE ET AUX ENERGIES ALTERNATIVES, Paris (FR)

(72) Inventors: Guillaume Turin, Lille (FR); Philippe Azais, Saint Egreve (FR); Yves Berthe De Pommery, Grenoble (FR); Lionel Picard, Seyssinet (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 79 days.

(21) Appl. No.: 15/123,509

(22) PCT Filed: Feb. 27, 2015

(86) PCT No.: PCT/EP2015/054147
§ 371 (c)(1),
(2) Date: Sep. 2, 2016

(87) PCT Pub. No.: WO2015/132151
PCT Pub. Date: Sep. 11, 2015

(65) Prior Publication Data
US 2017/0222289 A1  Aug. 3, 2017

(30) Foreign Application Priority Data

Mar. 3, 2014 (FR) ..................................... 14 51692

(51) Int. Cl.
*H01M 12/08* (2006.01)
*H01M 2/30* (2006.01)
(Continued)

(52) U.S. Cl.
CPC ......... *H01M 12/08* (2013.01); *H01M 2/1022* (2013.01); *H01M 2/1077* (2013.01);
(Continued)

(58) Field of Classification Search
CPC .............................. H01M 2/06; H01M 2/065
(Continued)

(56) References Cited

U.S. PATENT DOCUMENTS 5,366,822 A   11/1994   Korall et al.
5,569,551 A   10/1996   Pedicini et al.
(Continued)

FOREIGN PATENT DOCUMENTS

EP   2 530 762 A1   12/2012
WO   00/36669 A1   6/2000
WO   00/36692 A1   6/2000

OTHER PUBLICATIONS

International Search Report dated Apr. 10, 2015 in PCT/EP2015/054147 filed Feb. 27, 2015.
(Continued)

*Primary Examiner* — Stewart A Fraser
*Assistant Examiner* — Rachel L Zhang
(74) *Attorney, Agent, or Firm* — Oblon, McClelland, Maier & Neustadt, L.L.P.

(57) ABSTRACT

An electrochemical assembly module of a system for storing energy, including an assembly of a plurality of elementary gas-electrode electrochemical cells, the assembly including a plurality of lugs respectively associated with the plurality of elementary electrochemical cells, the lugs being connected together by a connecting holder and receiving terminals of the elementary electrochemical cells so that the terminals are all electrically connected to one another by the connecting holder, and a plurality of elements forming connecting clips each receiving at least two terminals of at
(Continued)

least two elementary electrochemical cells so that the at least two terminals are electrically connected to each other by the element forming a connecting clip that is associated therewith.

25 Claims, 8 Drawing Sheets

(51) Int. Cl.
*H01M 2/10* (2006.01)
*H01M 2/20* (2006.01)
*H01M 12/06* (2006.01)

(52) U.S. Cl.
CPC ............ *H01M 2/202* (2013.01); *H01M 2/30* (2013.01); *H01M 12/06* (2013.01)

(58) Field of Classification Search
USPC ........................................ 429/402, 403, 405
See application file for complete search history.

(56) References Cited

U.S. PATENT DOCUMENTS

| | | |
|---|---|---|
| 6,517,967 B1 | 2/2003 | Shrim et al. |
| 7,943,252 B2 | 5/2011 | Yoon et al. |
| 2009/0191452 A1 | 7/2009 | Anantharaman et al. |
| 2011/0177377 A1 | 7/2011 | Dube |
| 2011/0189514 A1 | 8/2011 | Lee et al. |
| 2011/0210954 A1 | 9/2011 | Murphy et al. |
| 2012/0021303 A1 | 1/2012 | Amendola et al. |
| 2013/0059171 A1 | 3/2013 | Kim et al. |
| 2013/0115531 A1 | 5/2013 | Amendola et al. |
| 2016/0020498 A1* | 1/2016 | Yoshida ................ H01M 12/06 429/405 |

OTHER PUBLICATIONS

French Search Report dated Nov. 26, 2014 in FR 1451692 filed Mar. 3, 2014.

* cited by examiner

ASSEMBLY MODULE COMPRISING ELECTROCHEMICAL CELLS RECEIVED BY LUGS AND CONNECTING CLIPS

TECHNICAL FIELD

The present invention relates to the field of elementary electrochemical cells intended to be assembled in electrochemical modules themselves assembled together to form an energy storage system, for example a battery pack, these electrochemical cells comprising at least one gas electrode, and more particularly to the field of electrochemical cells of the metal-gas type. It relates in particular to the arrangement of electrochemical modules of such cells, the electrical connection of terminals of such cells and the circulation of the gas in the modules to each gas electrode.

The invention finds applications in numerous fields in industry, in particular for stationary or on-board applications, in particular for the field of the electrical supply of land, air, space and/or nautical transport vehicles, for example for the electrical supply of hybrid and/or electrical vehicles for which an arrangement of a large number of electrochemical cells and a dynamic circulation of gas are required.

It thus proposes an electrochemical assembly module comprising a plurality of elementary electrochemical cells comprising at least one gas electrode, an energy storage system comprising a plurality of such electrochemical assembly modules, and a method for producing such an electrochemical assembly module.

PRIOR ART

Accumulators are systems for storing electrical energy in chemical form. They are based on a reversible, that is to say rechargeable, electrochemical system. However, all the proposals listed below remain valid for primary (non-rechargeable) systems, such as for example aluminum-air or zinc-air, unless mentioned to the contrary.

The energy storage system is an assembly of electrochemical modules, themselves assemblies of elementary electrochemical cells that constitute accumulators. In the energy storage system, the electrochemical cells are connected and managed by control electronics, also referred to as BMS electronics, standing for "battery management system", which makes it possible to optimise charging and discharging and to prolong the service life.

The accumulators or cells contain chemical reagents which, once activated, make it possible to supply electricity on demand. These electrochemical reactions are activated in the elementary electrochemical cell, between a positive electrode and a negative electrode immersed in an electrolyte, when an electrical charge is connected to the terminals of the cell. By way of example, Li-ion technology consists of using the electrochemical circulation of the lithium ion in two materials and at different potentials: the positive electrode and the negative electrode constitute the two oxidation-reduction potentials, and the difference in potential creates the voltage in the battery. In the course of use (the accumulator discharges), the negative electrode releases lithium in $Li^+$ ionic form. The $Li^+$ ions then migrate towards the positive electrode, via the ionic conductive electrolyte. The passage of each $Li^+$ ion in the accumulator is compensated for by the passage of an electron in the external circuit (current flowing from the terminals of the accumulator), in the opposite direction, thus creating the electric current enabling the device associated with the battery to function. There is then electric current until there is no longer any lithium in the negative electrode: the accumulator is then discharged and it is recharged in the reverse process.

With regard to the design of elementary electrochemical cells, three main types of architecture geometry are normally used. Thus, conventionally and as known per se, the cells may have a cylindrical geometry, a prismatic geometry or a pouch-cell geometry.

In addition, among the various possibilities existing for the choice of the electrodes of the elementary electrochemical cells, electrochemical cells that comprise at least one gas electrode, also referred to as "gas-electrode cells", are known, and in particular cells of the so-called metal-gas type. The present invention relates particularly to this type of elementary electrochemical cell, and more specifically to elementary electrochemical cells comprising two gas electrodes, hereinafter referred to as "double gas-electrode cells". For example, elementary electrochemical cells with a prismatic or pouch geometry may comprise two gas electrodes, one gas electrode on each flat face of the cell, as described in particular in the patent application EP 0 823 135 A1.

In the case of gas-electrode cells, optimisation of the circulation of gas to allow optimum arrival of the gas at the gas electrodes of each cell of an assembly module of an energy storage system is a well-known fundamental problem for making it possible to improve the efficiency of the batteries of the metal-gas type, in terms of reaction kinetics, whatever the envisaged application of these batteries.

In addition, according to the applications sought, particularly in the transport field (land, air, naval, space, among many others) or in the field of power tools, vibration problems may arise in the electrochemical modules, which cause unwanted disconnections at the connections of the terminals of the cells and phenomena of vibratory resonance in the electrochemical modules. These vibration problems make it necessary to design robust devices for maintaining the connections of the cells and of the cells with each other.

Thus, in the case of gas-electrode cells, there exists both a need in terms of optimisation of the circulation of the gas towards the gas electrodes of the cells and a need in terms of reliability of the electrical connections of the cells with each other by means of electrical connection systems that are only slightly or not sensitive to vibrations, while optimising the volume and mass of the modules integrating these cells.

Solutions proposed for ensuring the holding of the cells and connections in an electrochemical module and for preventing vibration phenomena are already known in the prior art. Thus, for example, the U.S. Pat. No. 7,943,252 B2 and the patent application US 2011/0189514 A1 propose devices for assembling and fixing the cells together robustly, in particular for cells of the Li-ion type normally installed in hybrid and electrical vehicles, as well as in power tools.

In the more specific case of gas-electrode cells with prismatic geometry, various solutions have been provided for proposing devices assisting the provision of gas at the surface of each cell. Some interpose twin-pole plates between the cells. However, these solutions are not sufficiently satisfactory in terms of saving on weight and space.

Other solutions relate to the arrangement of the cells for optimising the circulation of air in the electrochemical module. Thus, for example, the U.S. Pat. No. 6,517,967 B1 and the international application WO 00/36692 A1 propose a compact arrangement of cells with prismatic geometry, placing them one above the other by means of a suitable support structure. However, the spacing between cells causes a loss of space with regard to the thickness of the module. The patent application US 2009/0191452 A1 for its part proposes optimum circulation of gas in a module for cells with a cylindrical geometry. However, with cells with a cylindrical geometry, the saving in space is less than for a prismatic or pouch design.

Moreover, the U.S. Pat. No. 5,366,822 A and the patent application EP 2 530 762 A1 propose an arrangement of cells with a flat prismatic geometry with spacings or channels for allowing the gas to circulate. However, the circulation of gas is not very efficient and such a design applying to cells with a pouch geometry requires the use of a casing stiffening the cell (of the type proposed by the patent applications US 2011/0210954 A1 and US 2013/0059171 A1) and, with such a device, the module increases in mass, and therefore decreases in energy per unit mass, which thus leads to losing the advantage of the pouch geometry. Moreover, this design is applied to cells of the zinc-air type, and cannot be envisaged for a cell of the lithium-air type, because of the constraints related to the use of metal lithium in an aqueous electrolyte.

The patent application US 2011/0177377 A1 further proposes a stack of cells with a pouch geometry in an electrochemical module. This solution is however not satisfactory in the case of double gas-electrode cells since it is necessary to provide a space for the circulation of the gas. The interposing of twin-pole plates between the pouch-geometry cells, effected to remedy this, adds weight and space in addition, which is also not desirable.

The international application WO 00/36669 A1 for its part proposes an arrangement of cells in parallel and in a zigzag for optimum saving on space and circulation of a gas according to the application sought, in particular mobile telephony. However, the connection and fixing of the cells, both at the level of the module and between them, are not developed.

DISCLOSURE OF THE INVENTION

The aim of the invention is thus to at least partially remedy the requirements mentioned above and the drawbacks relating to the designs of the prior art.

The invention aims in particular to propose a novel type of elementary electrochemical module comprising a plurality of gas-electrode cells, in particular of the metal-gas type, having a special design and architecture for optimising the circulation of gas, optimising the saving of space and the integration of the cells in the module, and optimising the electrical connection of the cells with each other. In particular, the invention aims to find a compromise solution between a module comprising an assembly of cells, which assists the circulation of gas in a way that is well distributed on the surface of each gas electrode, and a module, comprising an assembly of cells, that has a system for connecting cells that is reliable and insensitive to vibration, with optimised volume and mass.

The subject matter of the invention is thus, according to one of its aspects, an electrochemical assembly module of an energy storage system, comprising an assembly of a plurality of elementary electrochemical cells with gas electrode, characterised in that it comprises:
- a plurality of lugs associated respectively with the plurality of elementary electrochemical cells, the lugs being connected together by a connecting holder and receiving the terminals of the elementary electrochemical cells so that said terminals are all electrically connected together by the connecting holder,
- a plurality of elements forming connecting clips each receiving at least two terminals of at least two elementary electrochemical cells so that said at least two terminals are electrically connected to each other by the element forming a connecting clip that is associated therewith.

By virtue of the invention, it is possible to have a novel type of elementary electrochemical module, provided with gas-electrode cells, that integrates a special arrangement and connection of the cells. It can thus be possible to allow an optimum arrangement of the gas-electrode cells, in particular with a double gas electrode, in the electrochemical module for good circulation of the gas with reduced bulk. The principle of an element forming a connecting clip can allow easy insertion and removal of the cells, preferentially of the pouch-geometry type, without danger, and the holding in place of the cells while absorbing vibrations, while also providing simply modular effective connections (in series or in parallel). The invention can make it possible to avoid the propagation and amplification of vibrations inside the electrochemical module. Furthermore, the invention may also have an interest in terms of thermal management for cells with a prismatic or pouch geometry. In general, the invention can therefore afford a gain in terms of volume, mass, modular connection, reliability, simplicity, fixing of the cells and good circulation of the gas. Furthermore, the invention can allow a simple and effective mechanical fixing of the cells to each other and to the module in which they are assembled.

The elementary electrochemical module according to the invention may also comprise one or more of the following features taken in isolation or in accordance with all possible technical combinations.

The elementary electrochemical cells may advantageously have a prismatic or pouch geometry, and preferably a pouch geometry.

The electrochemical cells may particularly be of the metal-gas type, that is to say comprising at least one gas electrode and one metal electrode. In particular, the electrochemical cells may be of the lithium-air type.

The elementary electrochemical cells are preferentially cells with a double gas electrode.

The elementary electrochemical cells are moreover preferentially disposed in a zigzag in the electrochemical assembly module.

The connecting holder may comprise an output terminal for the electrochemical assembly module.

Said elements forming connecting clips may be in the form of a double Z clip.

The elementary electrochemical cells may be mounted in parallel in the electrochemical assembly module.

In this case, the lugs can receive the terminals with the same polarity of the elementary electrochemical cells. In addition, the elements forming connecting clips can each receive at least two terminals with the same polarity, opposite to the polarity of the terminals of the elementary electrochemical cells received in the lugs.

Said elements forming connecting clips may be electrically connected to each other by means of devices for connecting the elements forming the connecting clips.

The height of the elements forming the connecting clips may be greater than the height of the elementary electrochemical cells.

At least one element forming a connecting clip may be electrically connected to an output terminal.

The elementary electrochemical cells may be mounted in series in the electrochemical assembly module.

In this case, the elements forming connecting clips may comprise a first group of first elements forming connecting clips and a second group of second elements forming connecting clips, the first elements forming connecting clips electrically connecting the terminals of two elementary electrochemical cells in order to form pairs of elementary electrochemical cells, and the second elements forming connecting clips electrically connecting the terminals of two elementary electrochemical cells belonging respectively to two separate pairs of elementary electrochemical cells.

The first elements forming connecting clips and the second elements forming connecting clips may comprise respectively first and second insulating parts so as to allow electrical connection only between the elementary electrochemical cells that they connect together respectively.

The second elements forming connecting clips may each be interposed between a terminal of an elementary electrochemical cell in a first pair of elementary electrochemical cells, paired by a first element forming a connecting clip, and the corresponding lug of the elementary electrochemical cell, and between a terminal of another elementary electrochemical cell of a second pair of elementary electrochemical cells, distinct from the first pair, paired by a first element forming a connecting clip, and the corresponding lug of the other elementary electrochemical cell.

The elementary electrochemical cells may each comprise a positive terminal and a negative terminal, each situated at an opposite end of the elementary electrochemical cell, on a side of the elementary electrochemical cell different from the one or ones where the gas electrode or electrodes are situated.

Each positive or negative terminal of an elementary electrochemical cell may be disposed over the entire width of the elementary electrochemical cell.

The positive terminal and/or the negative terminal of each elementary electrochemical cell may encase the gas electrode associated with the end of the elementary electrochemical cell, over its entire width.

The module may moreover comprise a top part and a bottom part of a housing having forms suited to the insertion and/or holding of the elements forming the connecting clips.

Each element forming a connecting clip may be in the form of a single slender block.

Each element forming a connecting clip may comprise a plurality of gripping claws for receiving an associated elementary electrochemical cell.

The lugs and/or the elements forming the connecting clips may be in the form of a clip having on each side a complementary shape, in particular triangular, to allow the gripping of an elementary electrochemical cell.

Each lug and/or each element forming a connecting clip may comprise a folded shape, in particular in the form of a folded tongue, to allow the gripping of an elementary electrochemical cell.

The invention also relates, according to another of its aspects, to an energy storage system, characterised in that it comprises an assembly of a plurality of electrochemical modules as defined previously.

The invention also relates, in another of its aspects, to a method for producing an electrochemical assembly module as defined previously.

The method may in particular comprise the step of producing an element forming a connecting clip from a plate, in particular metal, for example made from copper, cut into a strip, in particular by stamping, said strip then being folded so as to give its final form to the element forming said connecting clip, in particular a double-clip form. The folding can be carried out so as to allow an elastic return for the element forming a connecting clip, contributing to the "spring" of the double clip that it forms.

The method may also comprise the step, for a first element forming a connecting clip used for mounting of the elementary electrochemical cells in series, consisting of covering the plate with a deposit of an insulating material, for example a plastics material, to form the insulating part of the first element forming a connecting clip, before said strip is folded.

All the features stated in the present description can be taken in isolation or in accordance with all technically possible combinations with other features.

BRIEF DESCRIPTION OF THE DRAWINGS

The invention can be understood better from a reading of the following detailed description of non-limitative example embodiments thereof, as well as from the examination of the schematic and partial figures of the accompanying drawing, in which.

In all these figures, identical references may designate identical or similar elements.

In addition, the various parts depicted in the figures are not necessarily depicted to a uniform scale, in order to make the figures more legible.

DETAILED DISCLOSURE OF PARTICULAR EMBODIMENTS

Figure 1:
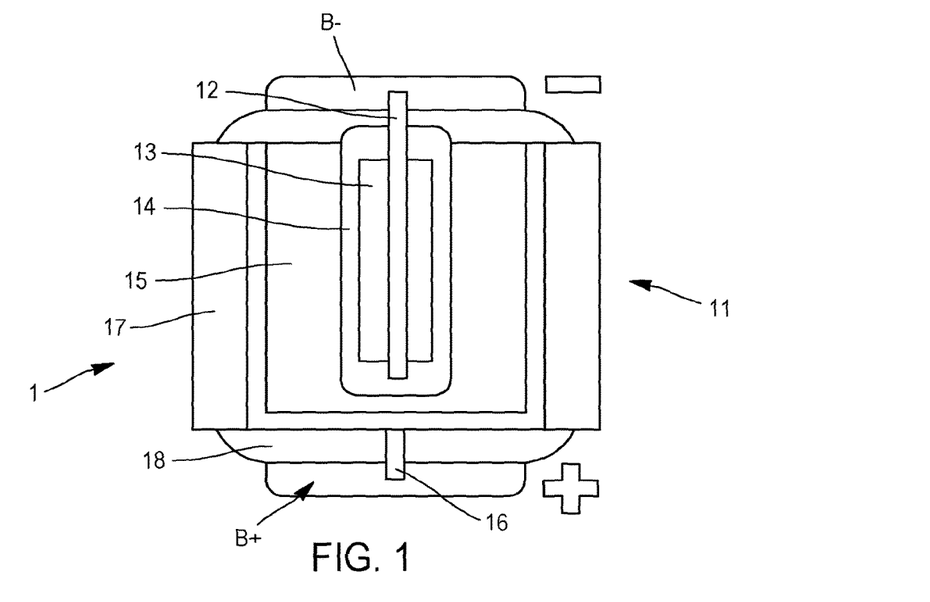
FIG. 1 depicts an example of architecture of an elementary electrochemical cell with double gas electrode able to be incorporated in an electrochemical assembly module according to the invention.

FIG. 1 depicts, schematically, an example of architecture of an elementary electrochemical cell 1 with a double gas electrode that can be used in an electrochemical assembly module 10 according to the invention.

Preferentially, the elementary electrochemical cell 1 has a pouch geometry, comprising a gas electrode on each face. In a variant, the elementary electrochemical cell 1 may have another type of architecture geometry, and in particular be of prismatic geometry.

In the remainder of the description, it is considered that the elementary electrochemical cell or elementary electrochemical cells 1 have a pouch geometry and are of the lithium-air type with double air electrode, aqueous electrolyte and membrane protecting the metal lithium.

As can be seen in FIG. 1, the electrochemical core 11 of the elementary electrochemical cell 1, situated between the negative terminal B− and the positive terminal B+ of the cell 1, comprises, in the order of superimposition from the centre of the cell towards the outside: a negative current collector 12, consisting for example of a sheet of copper, a sheet of metal lithium 13 covered with a protective membrane 14, a separator impregnated with electrolyte 15, a positive current collector 16, consisting for example of a nickel grille with a hydrophobic cladding, and a GDL (gas diffusion layer) 17 that promotes the diffusion of the gas homogeneously on the surface of the electrode. This stack thus obtained is repeated by symmetry with respect to the negative current collector 12 so as thus to constitute the double air electrode. In addition, the reference 18 in FIG. 1 represents the pouch of the cell 1, which corresponds to a flexible housing.

Figure 2:
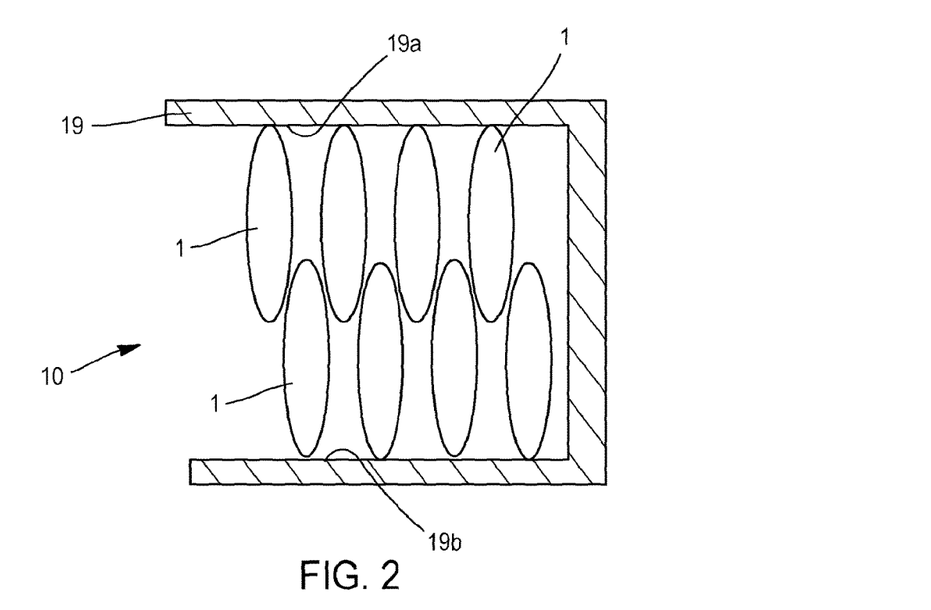
FIGS. 2 and 3 illustrate possible arrangements of elementary electrochemical cells in an electrochemical assembly module according to the invention.
Figures 3, 4:
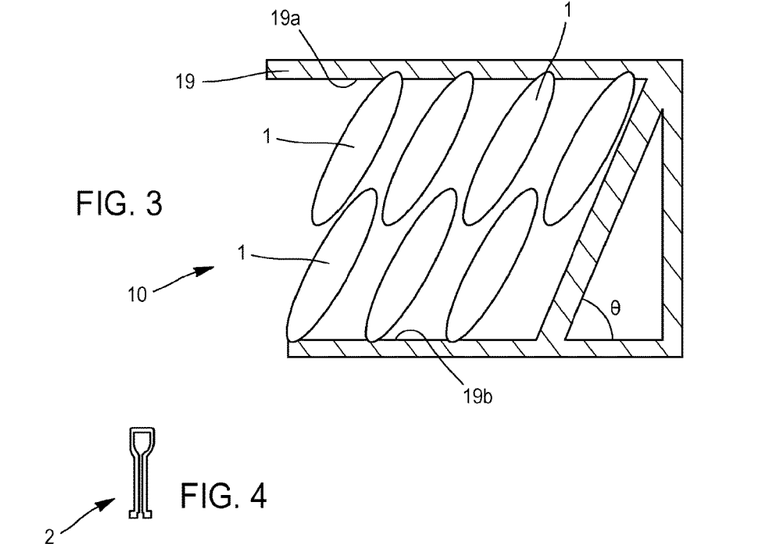
FIG. 4 depicts, in plan view, an example of a lug used in an electrochemical assembly module according to the invention.

FIGS. 2 and 3 moreover illustrate the possibilities of arrangement of the elementary electrochemical cells 1 within the electrochemical assembly module 10.

Advantageously, the elementary electrochemical cells 1 are assembled in a zigzag inside the electrochemical assembly module 10.

The arrangement of the elementary electrochemical cells 1 in a zigzag in the assembly module 10 can make it possible to save on space while allowing the gas to circulate effectively.

Several configurations can be envisaged by varying the angle of inclination of the cells 1, in particular according to the space requirement and dimensions of the cells 1.

By way of example, FIG. 2 illustrates, in plan view (without the presence of the bottom and top covers of the assembly module 10), a first configuration of an arrangement of the elementary electrochemical cells 1 in a zigzag in the module 10, in which the cells 1 are disposed substantially perpendicularly with respect to the opposite internal walls 19a and 19b of the housing 19 of the module 10.

In addition, FIG. 3 illustrates, in a representation similar to the one in FIG. 2, a second configuration of an arrangement of the elementary electrochemical cells 1 in a zigzag in the module 10, in which the cells 1 are disposed with respect to the opposite internal walls 19a and 19b of the housing 19 of the module 10 with an angle of inclination θ of less than 90°, in particular substantially equal to 45°.

FIG. 4 also depicts, in plan view, an example of a lug 2 used in the assembly module 10 according to the invention for receiving a positive B+ or negative B− terminal of an elementary electrochemical cell 1.

The lug 2 of the module 10 is in particular in the form of a narrow clip that enables the cell 1 placed therein to be gripped. The lug 2 is preferentially produced from a conductive metal, and can be formed by cropping and bending.

The lug 2 may be designed to adapt to the thickness of the cell 1 that it receives, in particular depending on whether the latter has a pouch or prismatic geometry.

The height of the lug 2 is preferentially equal to that of the cell 1 that is associated therewith, or, in a variant, slightly less, in order to exert a gripping effect on the largest possible surface area.

Moreover, the lug 2 may be designed to exert a gripping effect only at the terminal of the cell. This is because the area of the cell 1 gripped must preferentially not project beyond the terminal in order not to block the gas electrodes of the electrochemical cell 1.

In a variant, as described hereinafter, the lug 2 may have several connecting "claws", in particular at least two, that can grip the cell 1 on a zone projecting beyond the limit of its terminal more effectively while enabling the gas electrodes to "breath".

Figure 5:
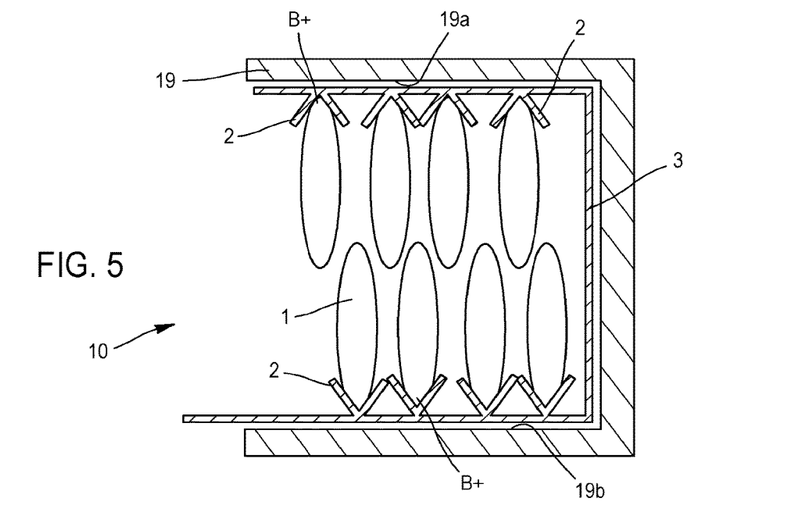
FIG. 5 depicts, in plan view, an example of an electrochemical assembly module comprising a plurality of lugs electrically connected together by a connecting holder.

FIG. 5 also depicts, in plan view (without the presence of the bottom and top covers of the assembly module 10), an example of an electrochemical assembly module 10 comprising a plurality of lugs 2 electrically connected together by a connecting holder 3.

The cells 1 are electrically connected together and fixed in the housing 19 of the module 10 by means of the lugs 2 present on the internal walls 19a and 19b of the module 10. The lugs 2 are situated suitably to allow the required zigzag arrangement of the cells 1 in the module 10, as described previously with reference to FIGS. 2 and 3.

Advantageously, there are in the modules 10 as many lugs 2 as there are elementary electrochemical cells 1, each cell 1 having a terminal B+ or B− fixed by a lug 2. Nevertheless, in accordance with the invention, all the cells 1 connect their positive terminal B+ or their negative terminal B− to the lugs 2. In other words, the terminals connected to the lugs 2 are of the same polarity. For example, in FIG. 5, the positive terminals B+ of the cells 1 are connected to the lugs 2 of the module 10.

In addition, all the lugs 2 of the module 10 are electrically connected together by a connecting holder or bus 3.

The connecting holder 3 may consist of a rigid conductive metal plate, flexible layers of conductive wires, conductive metal paints, or any other electrically conductive device, flexible or rigid, as fine and light as possible.

All the lugs 2 of the module 10 are thus electrically connected together and connected to one or more of the output terminals 7 (see FIG. 9) of the module 10 by means of the connecting holder 3.

Preferentially, the lugs 2 of the module 10 may be fixed to the connecting holder 3 by welding.

Figure 6:
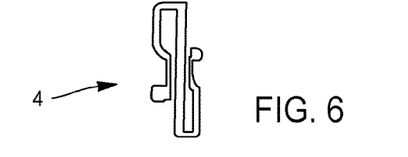
FIG. 6 depicts, in plan view, an example of an element forming a connecting clip of an electrochemical assembly module according to the invention.

FIG. 6 has now shown, in plan view, an example of an element forming a connecting clip 4 used in the assembly module 10 according to the invention.

In this example, and in no way limitatively, the element forming a connecting clip 4, or the connecting clip 4, makes it possible to electrically connect together two terminals with the same polarity of two elementary electrochemical cells 1.

Thus each cell 1 of the module 10 can be paired and held by an element forming a connecting clip 4 having the form of a double connecting clip in a Z, adapted to the thickness of the cell 1 according to its geometry, in particular prismatic or pouch.

The elements forming connecting clips 4 may particularly be of two types according to the mounting in parallel or series of the elementary electrochemical cells 1 in the assembly module 10.

The configurations of the arrangements of the cells 1 in parallel and in series are detailed below, respectively with reference to FIGS. 6 to 9 and 10 to 13.

Mounting of the Cells 1 in Parallel in the Electrochemical Assembly Module 10

The element forming a connecting clip 4 used for mounting the elementary electrochemical cells 1 in parallel in the assembly module 10 according to the invention may be produced from a conductive material, for example copper, and be entirely conductive.

The element forming a connecting clip 4 may then comprise, on its external surface, at least one connecting device 5 (see FIG. 9 in particular) that makes it possible to connect it to the other elements forming connecting clips 4, so as to have connection in parallel. In this regard, all the terminals of the cells 1 connected to the lugs 2 of the assembly module 10 are at one pole, and all the terminals of the cells 1 connected by the elements forming connecting clips 4 are at the other pole.

Figure 9:
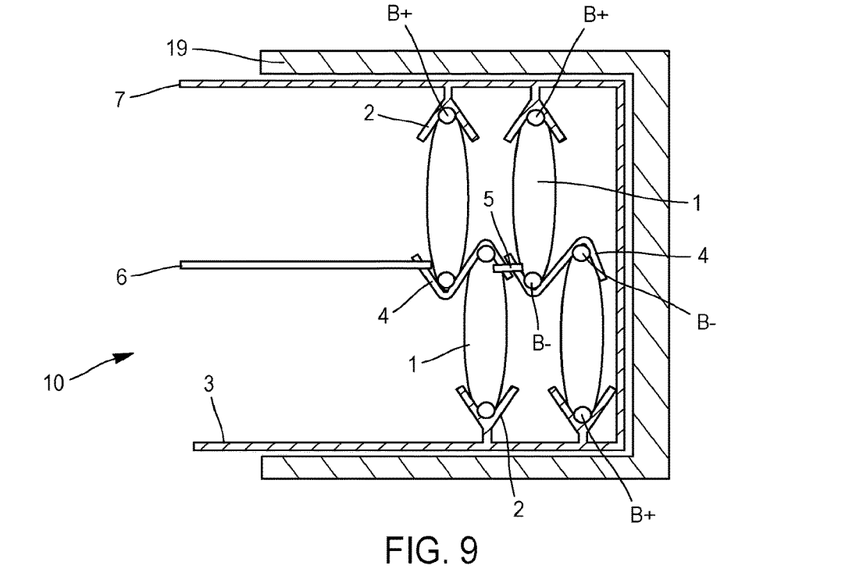
FIG. 9 depicts, in plan view, an example of an electrochemical assembly module according to the invention having a parallel mounting of the elementary electrochemical cells.

The connecting device 5 may be of any type, being for example in a dovetail, trapezoidal or circular shape or being in the form of a magnetic contact, a connecting tab, a spring or a connecting clip, among others. Advantageously, the assembly module 10 according to the invention is designed to be removable. In this way, the connection of the elements forming connecting clips 4 to each other by non-removable methods such as welding or adhesive bonding is not desired.

Figure 7:
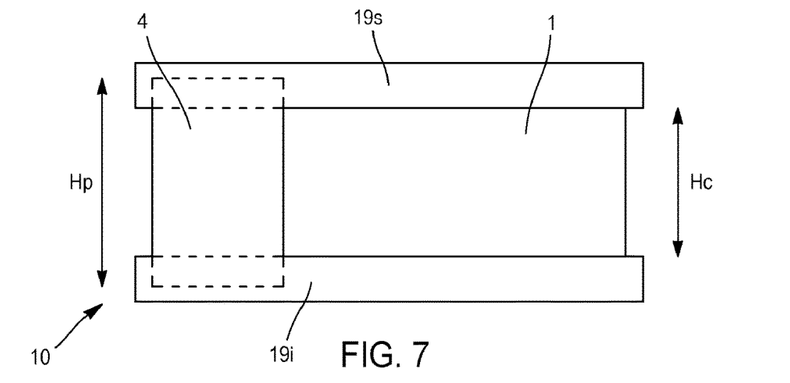
FIG. 7 depicts, in front view, the insertion of an element forming a connecting clip in the housing of an electrochemical assembly module according to the invention, in a configuration of parallel mounting of the elementary electrochemical cells.

FIG. 7 depicts, in front view, an example of an element forming a connecting clip 4 inserted in the top 19s and bottom 19i parts of the housing 19 of the assembly module 10.

As can be seen in this FIG. 7, the height Hp of the element forming a connecting clip 4 is greater, in particular slightly greater, than the height Hc of the elementary electrochemical cell 1 so as to grip the terminal of the cell 1 over the greatest surface area possible and so as to come to be fixed in the top 19s and bottom 19i parts of the housing 19 of the module 10.

Figure 8:
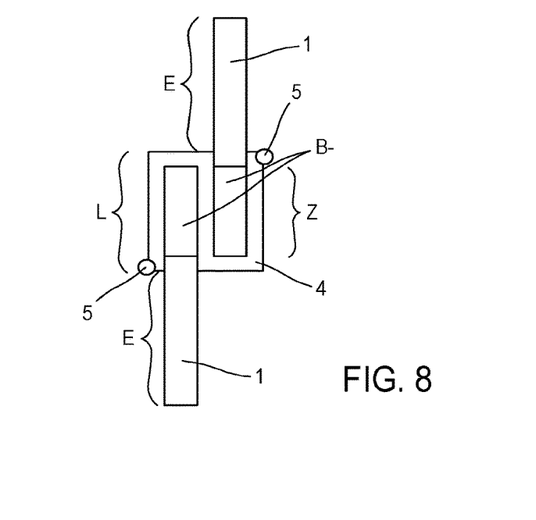
FIG. 8 depicts, in plan view, an example of the equipping of two elementary electrochemical cells of an electrochemical assembly module according to the invention, by means of an element forming a connecting clip, in a parallel mounting configuration of the elementary electrochemical cells.

FIG. 8 depicts, in plan view, an example of the equipping of two elementary electrochemical cells 1 by means of an element forming a connecting clip 4. The reference Z indicates the zone of the cells 1 gripped by the element forming a connecting clip 4.

As can be seen in this FIG. 8, the two elementary electrochemical cells 1 are advantageously paired at their terminal, for example negative B− in the example depicted, without projecting beyond the limit of the gas electrodes E of the cells 1. In this way, it can be possible not to obturate the exchange of a gas at the level of the cells 1.

In the same way, the total length L of the element forming a connecting clip 4 is advantageously determined so as to allow the arrangement of a pair of cells 1 so as to optimise the space without obstructing the gas electrodes E.

The mounting of the elementary electrochemical cells 1 in parallel in the electrochemical assembly module 10 therefore makes it possible to connect two cells 1 together by a terminal of the same pole, respectively positive or negative, by means of an element forming a connecting clip 4 in the form of a double Z clip, the other terminal, respectively negative or positive, being connected to the module 10 by the lugs 2. Each pair of cells is connected in parallel to the other cells 1 by contact of the element forming connecting clips 4 with each other, in particular by means of the connecting devices 5. Thus the assembly module 10 has two connecting output terminals, an output terminal 6 at one pole connecting all the elements forming the connecting clips 4 with each other and an output terminal 7 at the opposite pole connecting all the lugs 2 together (see FIG. 9).

FIG. 9 depicts, in plan view (without the presence of the top and bottom covers of the module, an example of an electrochemical assembly module 10 comprising a mounting of the elementary electrochemical cells 1 in parallel as described previously.

Mounting of the Cells 1 in Series in the Electrochemical Assembly Module 10

The elements forming connecting clips used for the mounting of the elementary electrochemical cells 1 in series in the electrochemical assembly module 10 according to the invention are of two types in order to adapt the module 10 to a connection in series.

Thus the elements forming connecting clips comprise a first group of first elements forming connecting clips 4a and a second group of second elements forming connecting clips 4b. The first elements forming connecting clips 4a electrically connect the terminals B+, B− of two elementary electrochemical cells 1 in order to form pairs of elementary electrochemical cells 1, while the second elements forming connecting clips 4b electrically connect the terminals B+, B− of two separate pairs of elementary electrochemical cells.

The first elements forming connecting clips 4a are in the form of small Z clips, in particular similar to the elements forming connecting clips 4 used for mounting the elementary electrochemical cells 1 in parallel. They can thus make it possible to pair two cells 1 together in the same way as for mounting in parallel. On the other hand, the second elements forming connecting clips 4b are in the form of large Z clips, which allow electrical connection between two pairs of cells 1.

The first 4a and/or second 4b elements forming connecting clips can be produced from a conductive material, for example copper.

The first 4a and second 4b elements forming connecting clips advantageously comprise an insulating outer part 8a and 8b in order to prevent electrical connection between the pairs of cells 1 on the other hand and connection between the cells 1 and the module 10 on the other hand. However, they provide an electrical connection between the two cells 1 that they connect.

In the same way as described previously with reference to the parallel mounting of the cells 1, two cells 1 paired together, by a first 4a or second 4b element forming a connecting clip, are gripped at their terminal B+, B−, without projecting beyond the limit of the gas electrode so as not to block the exchange of gas.

Figure 10:
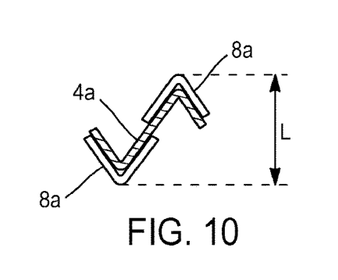
FIG. 10 depicts, in plan view, an example embodiment of a first element forming a connecting clip for the mounting in series of elementary electrochemical cells in an electrochemical assembly module according to the invention.

FIG. 10 shows, in plan view, an example embodiment of a first element forming a connecting clip 4a for mounting elementary electrochemical cells 1 in series in an electrochemical assembly module 10 according to the invention.

The first elements forming connecting clips 4a, or small clips 4a may overall have the same form, the same dimensions and/or the same characteristics as the elements forming connecting clips 4 used for mounting the cells 1 in parallel in the module 10. However, they are not provided with connection devices for connecting them together.

The small clips 4a are moreover covered with an insulating part 8a, preferably flexible, for example made from a plastics material, in order to prevent any connection together.

In addition, as already indicated and in the same way as for the elements forming connecting clips 4 used for mounting the cells 1 in parallel in the module 10, two elementary electrochemical cells 1 paired by a small clip 4a are grouped at their terminal B+ or B−, without projecting beyond the limit of the gas electrodes. Furthermore, the total length L of a small clip 4a is determined so as to enable it to be arranged so as to optimise the space without obstructing the gas electrodes. The height of a small clip 4a is also preferentially greater, in particular slightly greater, than that of the cell 1 in order to grip its terminal B+ or B− over the largest surface area possible and to be fixed in the top 19s and bottom 19i parts of the housing 19 of the module 10.

Figure 11:
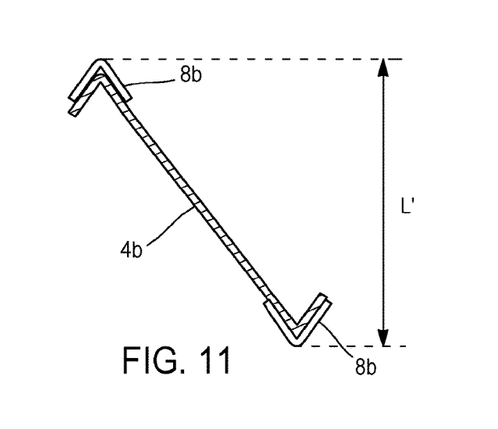
FIG. 11 depicts, in plan view, an example embodiment of a second element forming a connecting clip for the mounting in series of elementary electrochemical cells in an electrochemical assembly module according to the invention.

FIG. 11 further depicts, in plan view, an example embodiment of a second element forming a connecting clip 4b for mounting elementary electrochemical cells 1 in series in an electrochemical assembly module 10 according to the invention.

The second elements forming connecting clips 4b, or large clips 4b, are used for electrically connecting together two pairs of elementary electrochemical cells 1 produced from their connection with a small clip 4a. Their length L' is therefore equal to the total length of two cells 1 paired by a small clip 4a.

A large clip 4b is interposed between the lugs 2 of the module 10 and the terminals B+ or B− of two pairs of cells 1 that it connects electrically, in order to isolate them electrically from the module 10 by means of the insulating part 8b, advantageously designed in the same material as that of the small clips 4a, while connecting them together. More particularly, the large clips 4b are each interposed between a terminal B+, B− of an elementary electrochemical cell 1 of a first pair of elementary electrochemical cells 1, paired by a small clip 4a, and the corresponding lug of the elementary electrochemical cell 1, and between a terminal B+, B− of another elementary electrochemical cell 1 of a second pair of elementary electrochemical cells 1, separate from the first pair, paired by a small clip 4a, and the corresponding lug 2 of the other elementary electrochemical cell 1.

Moreover, in the same way as for the small clips 4a, two cells 1 paired by a large clip 4b are gripped at their terminal B+, B−, without projecting beyond the limit of the gas electrodes.

In addition, the height of a large clip 4b is less, in particular slightly less, than that of the cell 1 in order to grip its terminal over the largest surface area possible, while being greater, in particular slightly greater, than the height of a lug 2 of the module 10 in order to prevent any short-circuit.

Figure 12:
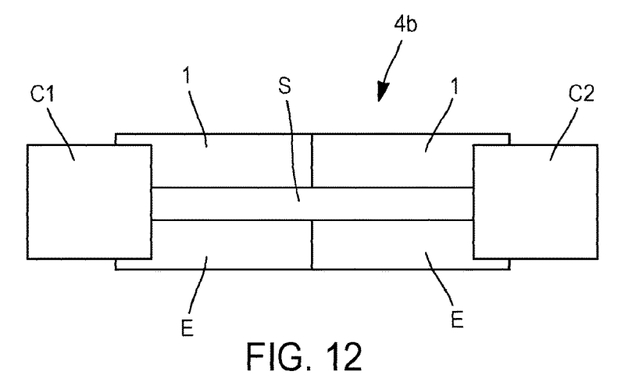
FIG. 12 depicts, in front view, an example of a second element forming a connecting clip for the mounting in series of elementary electrochemical cells in an electrochemical assembly module according to the invention.

FIG. 12 depicts schematically, in front view, an example of a large clip 4b for connecting two pairs of cells 1.

As can be seen in this FIG. 12, the two connections C1 and C2 of a large clip 4b, where the terminals of two cells 1 are respectively received, are connected by a conductive surface S, flexible or rigid, and preferably fine and covered with an insulating sheath (not shown), and with a width very much less than that of the cell 1, in order to minimise the obstruction of the electrode to gas E while ensuring a sufficient connection.

Figure 13:
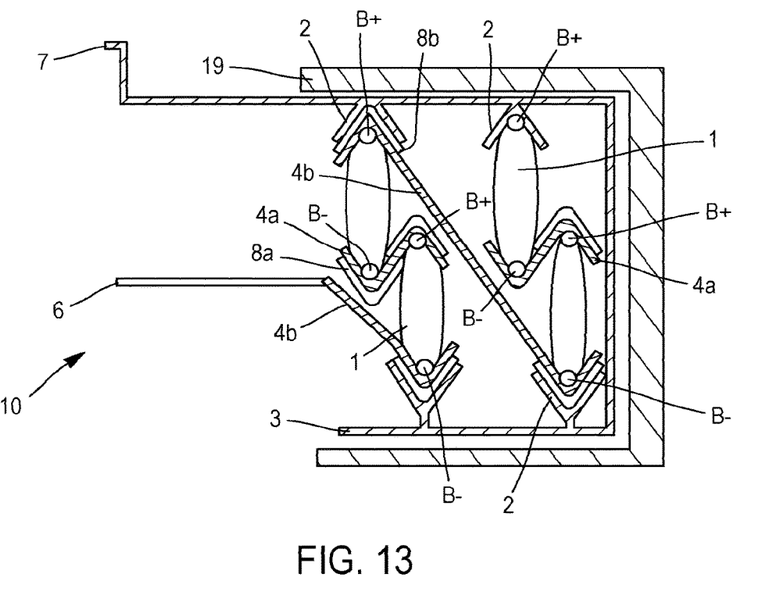
FIG. 13 depicts, in plan view, an example of an electrochemical assembly module 10 comprising a mounting in series of elementary electrochemical cells 1.

Thus, in a mounting in series of the elementary electrochemical cells 1, each cell 1 is connected to the following one by alternately a small clip 4a and a large clip 4b. A first cell 1 is fixed by a lug 2 to the module 10, connected to the output terminal 7 of the module 10, and the other output terminal 6 passes through a double clip, small clip 4a or large clip 4b, depending on the module 10 and the number of cells 1.

FIG. 13 depicts, in plan view (without the presence of the top and bottom covers of the module), an example of an electrochemical assembly module 10 comprising a mounting in series of the elementary electrochemical cells 1.

Figure 14:
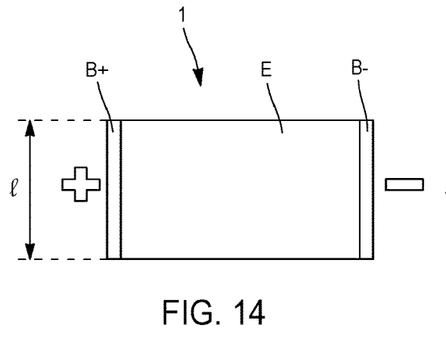
FIGS. 14 and 15 depict, in side view, two possible examples of an arrangement for the terminals of an elementary electrochemical cell of an electrochemical assembly module according to the invention.
Figure 15:
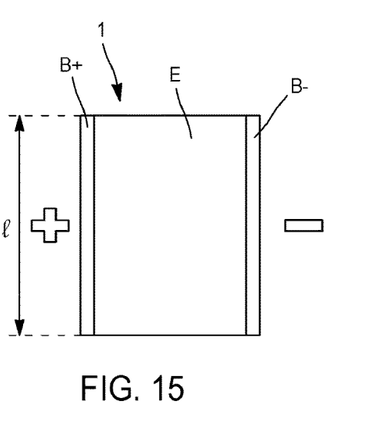

Possible configurations for the positive B+ or negative B− terminals of the elementary electrochemical cells 1 will now be described below.

This is because, in order to have optimum connection and fixing between the cell 1 and the element or elements forming the connecting clips 4, 4a, 4b, as well as between the cell 1 and the lug 2 of the module 10, the terminals B+, B− of the cell 1 must advantageously have a form that adapts easily, so as to be complementary or not to the lug 2 or to the element forming a connecting clip 4, 4a, 4b.

In addition, in the precise case of a cell 1 with a pouch geometry, it is desirable to stiffen the terminals B+, B− in order to make them easily fixable, while keeping the advantage of a flexible and lightweight cell 1 (without the use of a housing for example).

FIGS. 14 and 15 thus depict, in side view, two examples of possible arrangements for the terminals of an elementary electrochemical cell 1 of an electrochemical assembly module 10 according to the invention.

The cell 1 thus comprises two positive B+ or negative B− terminals, each situated at an opposite end of the cell 1, on a side of the cell 1 different from those where the gas electrodes are situated. Preferentially, the terminals B+, B− are disposed over the entire width I of the cell 1 in order to have maximum connection surface area and fixing. The terminals thus have a roughly slender form, their cross section being able to vary so as to adapt to the element forming a connecting clip.

Figure 16:
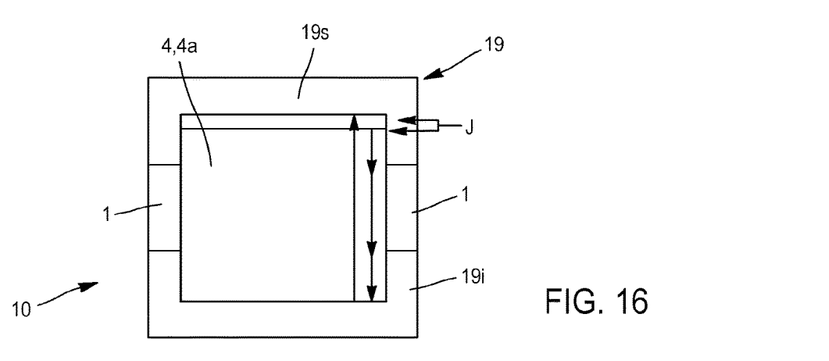
FIGS. 16 and 17 depict a possible configuration of the top and bottom parts of the housing of an electrochemical assembly module according to the invention.
Figure 17:
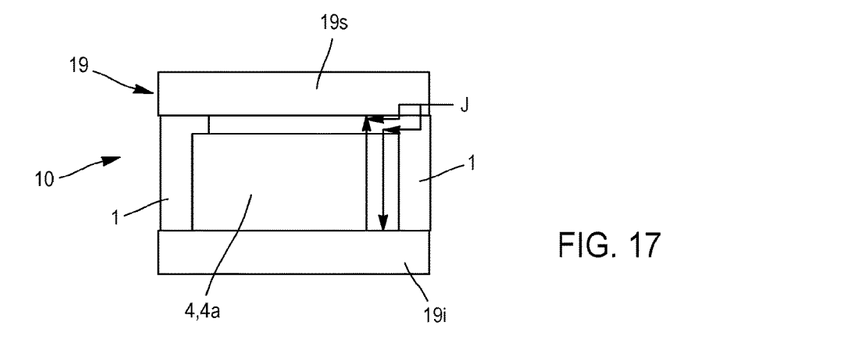

A description will now be given below of the desirable specific configuration of the housing 19 of the electrochemical assembly module 10 according to the invention.

FIGS. 16 and 17 thus depict the possible configuration of the top 19s and bottom 19i parts of the housing 19 of an electrochemical assembly module 10 according to the invention.

As can be seen in these FIGS. 16 and 17, the top 19s and bottom 19i parts of the housing 19 of the module 10 have forms allowing the insertion and holding in position of the elements forming connecting clips 4, 4a, 4b and in particular the elements forming the connecting clips 4, for mounting in parallel, and first elements forming connecting clips 4a for mounting in series. These forms may for example be defined by grooves, pins or holes, among others, in order to maintain the clips 4, 4a in tension and thus ensure the gripping and connection of the cells 1.

Moreover, the top 19s and bottom 19i parts of the housing 19 also make it possible to provide an abutment on the cells 1 in order to prevent the longitudinal movement thereof. Advantageously, there thus exists a clearance J between the clip 4, 4a and the top 19s and bottom 19i parts. Thus the fixing of the clip 4, 4a between the top 19s and bottom 19i parts has a small clearance providing contact of the cells 1 with the top 19s and bottom 19i parts. The clearance may depend on the configuration envisaged for the holding in position of the clip 4, 4a compressed by means of the top 19s and bottom 19i parts of the module 10.

Examples of particular configurations for the electrochemical assembly module 10 according to the invention will now be described below.

This is because various configurations for the elements forming connecting clips 4, 4a, 4b and the terminals B+, B− of the elementary electrochemical cells 1 can be envisaged, in particular according to the applications, the dimensions, the materials or the production methods.

Possible Configurations of the Element Forming a Connecting Clip 4 for Mounting in Parallel or 4a for Mounting in Series This element forming a connecting clip 4 or 4a, as described previously, is now referred to as the small clip 4, 4a.

The small clip 4, 4a or more precisely the double clip, preferentially has a slender form, with a Z-shaped cross section. It is preferentially produced from an electrically conductive material, in particular copper or one of the alloys thereof.

In a preferential embodiment, the small clip 4, 4a is obtained from a copper sheet cut in a strip, for example by punching, said strip then being bent in order to give its final form of double clip, ensuring that the bending allows a certain elastic return, thus contributing to the "spring" of the clip. For a small clip 4a used for mounting the cells 1 in series, the copper sheet is preferentially covered by deposition of an insulating material, for example a plastics material, on the areas to be insulated in order to form the insulating part 8a, before the bending step.

Figure 18:
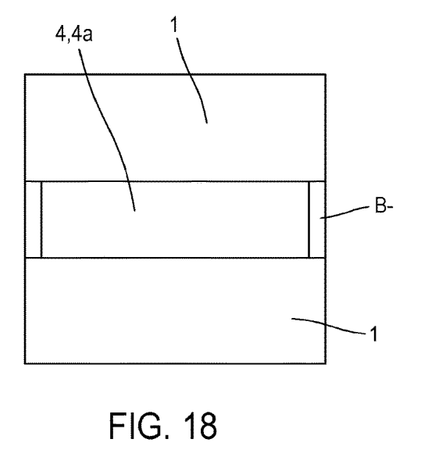
FIGS. 18 and 19 depict, respectively in front view and in side view, a first example of configuration of an element forming a connecting clip of an electrochemical assembly module according to the invention.
Figure 19:
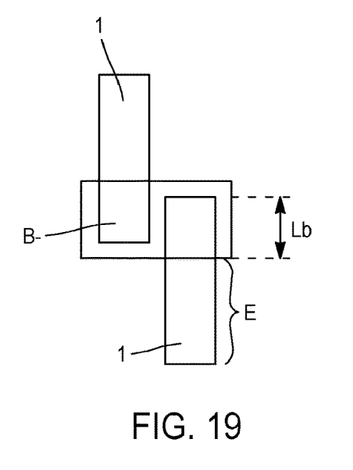
Figure 20:
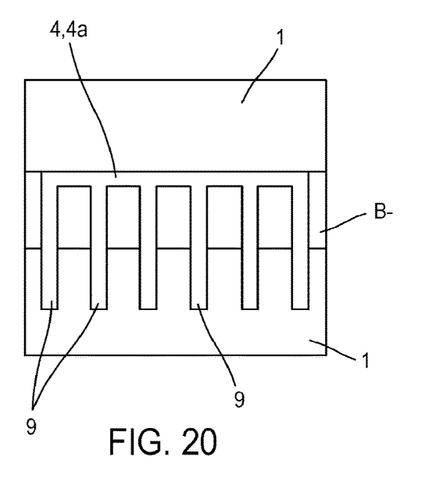
FIGS. 20 and 21 depict, respectively in front view and in side view, a second example of configuration of an element forming a connecting clip of an electrochemical assembly module according to the invention.
Figure 21:
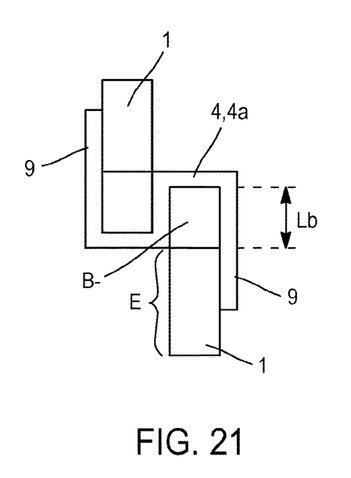

FIGS. 18 and 19 on the one hand and FIGS. 20 and 21 on the other hand depict two examples of possible configurations for the small clip 4 used for mounting the cells 1 in parallel or the small clip 4a used for mounting the cells 1 in series. According to these two configurations, the width of the small clip 4, 4a varies.

FIGS. 18 and 19 depict, respectively in front view and in side view, a first example of configuration of a small clip 4, 4a, in which the small clip 4, 4a is in the form of a single slender block.

In addition the small clip 4, 4a is provided for gripping the terminals, here negative B−, of the cells 1 over their entire length $L_b$. Preferentially, the small clip 4, 4a does not project beyond the gas electrode E in order not to obstruct the arrival of gas.

FIGS. 20 and 21 depicts, respectively in front view and side view, a second example of a configuration of a small clip 4, 4a, in which the small clip 4, 4a has a plurality of gripping claws 9, at least two, to make it possible better to clip the cell 1 without obstructing the gas electrode E.

Each gripping claw 9 may project over the gas electrode E if it can be sufficiently fine not to obstruct the gas electrode E. Preferentially, each gripping claw 9 must have a small width and the total number of gripping claws 9 of each small clip 4, 4a must be limited in order not to obstruct the gas electrode E, or almost not, while having dimensions and being in sufficient number to provide sufficient gripping and connection according to the application, in particular in the case of vibrations.

Several possible solutions for holding an element forming a connecting clip 4, 4a, 4b, or double clip, in compression, that is to say in the gripped position, in order to better fix the elementary electrochemical cells 1 that it connects together, will now be described below.

In a first solution, the double clip 4, 4a, 4b itself has a pin at each end, said pins advantageously being obtained by bending. The top 19s and bottom 19i covers of the housing 19 of the module 10 have holes of the same size as said pins, said holes being adjusted slidably in order to be able to insert said pins therein. Said holes are advantageously disposed so that the double clip 4, 4a, 4b is held in the gripped position when said pins are inserted in said holes in the top 19s and bottom 19i covers of the housing 19 of the module 10.

In a second solution, the double clip 4, 4a, 4b has at its ends a winding, preferentially obtained by bending. The top 19s and bottom 19i covers of the housing 19 of the module 10 have pins of the same size as said windings, said pins being adjusted slidably in order to be able to position said windings therein. Said pins are advantageously disposed so that the double clip 4, 4a, 4b is held in the gripped position when the said windings are positioned around said pins of the top 19s and bottom 19i covers of the housing 19 of the module 10.

In a third solution, it may be possible, instead of inserting pins, to produce, in the top 19s and bottom 19i covers of the housing 19 of the module 10, grooves having the form of the impression of the profile of the double clips 4, 4a, 4b in a compressed configuration. This solution requires the height of the double clip 4, 4a, 4b to be greater than that of the cell 1 in order to be able to be inserted in the covers 19s and 19i of the module 10. It must also be ensured that there is a clearance between the double clip 4, 4a, 4b and the covers 19s, 19i of the module 10 in order to provide contact between the cells 1 and the covers 19s and 19i, so as to prevent any phenomenon of vibration of the cells 1.

In a fourth solution, extruded rods are used, to be inserted in the holes described in the first solution. It is also possible to use cropped sheets, the holes then having the form of the cross section of one of said sheets. By inserting the rods, or sheets, between the top 19s and bottom 19i covers of the housing 19 of the module 10, the double clip 4, 4a, 4b is held in compressed position. This solution is preferred for a double clip 4, 4a having gripping claws 9 as described previously.

In a fifth solution, it may be possible to insert a fixing tab on the clips of a double clip 4, 4a, 4b in order to maintain the gripping thereof. This solution may be employed for the cells 1 with a pouch geometry having a small thickness, in order to provide the gripping. This may also be a safety solution for preventing unwanted disconnection of the cells 1 for some applications, in particular in the case of shocks of vibrations. This solution may be adapted to a double clip 4, 4a having gripping claws 9 as described previously, the fixing tab then having to be sufficiently long to hold all the gripping claws 9 of the double clip 4, 4a.

Several of these solutions may also be combined together in order to obtain satisfactory gripping, according to the constraints of the application sought.

In the more specific case of the double clips 4 used for mounting the cells 1 in parallel, it must be ensured that the connection between the double clips 4 is provided, and in this case the constraints of use (shocks, vibrations) that may lead to unwanted disconnections are of little importance. Several solutions are envisaged for providing the connection between elements forming connection clips or double clips 4 for mounting in parallel.

A first solution consists of using a paint or magnetic coating; however, this solution is not necessarily very efficient in terms of electrical conduction and the magnetic properties may be insufficient to provide the connection in the event of shocks or vibrations.

A second solution consists of using connecting tabs for connecting the double clips 4 together, said tabs being obtained from a conductive material and providing a connection between two double clips 4. This solution may be a safety solution for preventing the unwanted disconnection of the cells 1 for some applications, in particular in the case of shocks or vibrations.

A third solution consists of using, on the double clip 4 side, a form of collar or tab, obtained directly during the cropping and forming of the double clip 4 from a sheet of conductive material. The collar or tab can then be folded over the following double clip 4 in order to provide electrical contact between them. The form and thickness must be designed so as to allow easy bending of said collar or tab, while ensuring holding thereof and, without elastic shrinkage, sufficient strength. The double clip 4 may also have at its lateral surfaces respectively a tab or a spring or a tongue or a stop, which provides the contact with respectively the tab or the spring or the tongue or the stop of the following double clip 4. The contact between the double clips 4, and therefore the maintenance of the electrical connection, is provided by keeping the cells 1 gripped under compression in module 10.

The principles concerning the putting and holding in position of an elementary electrochemical cell 1 in an electrochemical assembly module 10 according to the invention will now be described below.

To provide the holding in position of the cell 1 by its gripped terminals B+ and B−, several solutions are possible with regard to the clip, these solutions being the same whatever the lugs 2, which are in the form of clips, or for the elements forming the connecting clips 4, 4a, 4b, which are in the form of double clips.

Thus a first solution consists of giving a complementary form 21 to each side of the clip 4, 4a, 4b or 2. Thus the terminal B+ or B− of the cell 1 is kept under traction by compression (gripping) of the clip, and in particular through the shearing caused by said form 21 on the terminal B+ or B− of the cell 1.

The complementary form 21 may preferentially be that of a triangle.

Figure 22:
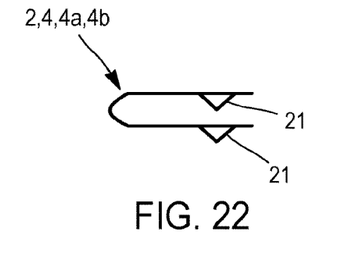
FIGS. 22 and 23 depict, in plan view, two examples of configurations of elements forming connecting clips or lugs of an electrochemical assembly module according to the invention, comprising complementary shapes for the gripping of the elementary electrochemical cells.
Figure 23:
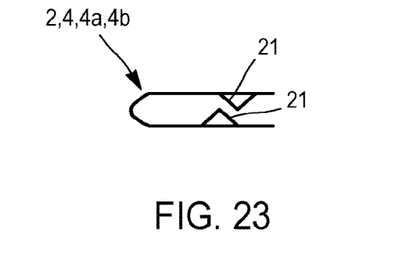

The two complementary forms 21 on each side of the clip 4, 4a, 4b or 2 may be facing, as depicted in FIG. 22. In a variant, the two complementary forms 21 may be offset in a zigzag, as depicted in FIG. 23.

The terminal B+ or B− of the cell 1 for such a first solution is preferably flat.

Figure 24:
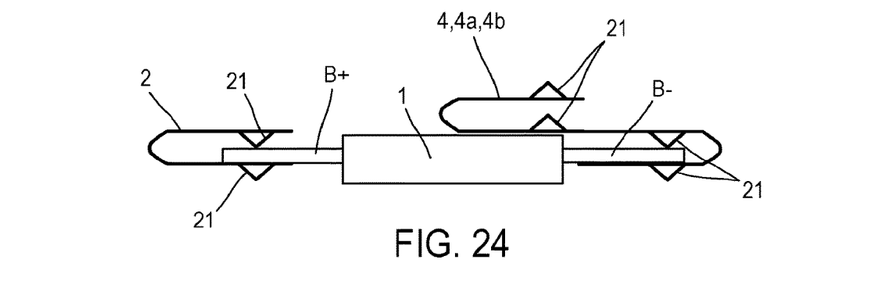
FIGS. 24 and 25 depict, in plan view, the positioning of a lug and of an element forming a connecting clip comprising complementary shapes on an elementary electrochemical cell.
Figure 25:
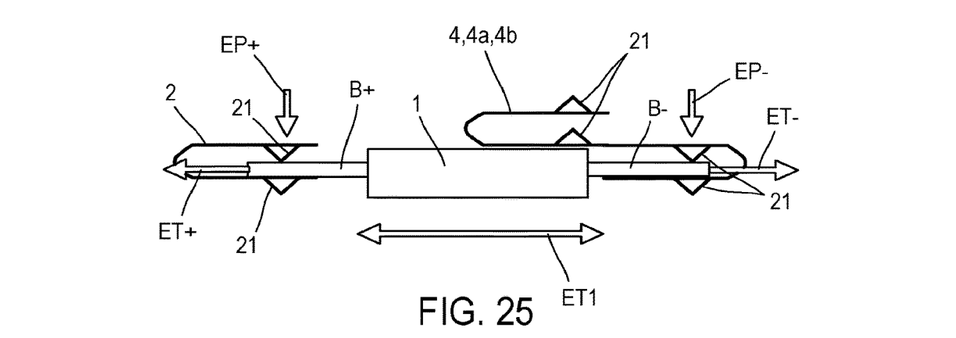

FIGS. 24 and 25 moreover depict, in plan view, the positioning of a lug 2 comprising complementary forms 21 on the positive terminal B+ or an elementary electrochemical cell 1 and the positioning of an element forming a connecting clip 4, 4a on the negative terminal B− of the elementary electrochemical cell 1.

In FIG. 25 more precisely, the references EP+, ET+, ET1, EP− and ET− represent respectively the gripping force of the lug 2 on the positive terminal B+, the resulting traction force on the positive terminal B+, the resulting traction force on the cell 1, the gripping force of the element forming a connecting clip 4 on the negative terminal B− and the resulting traction force on the negative terminal B−.

Figure 26:
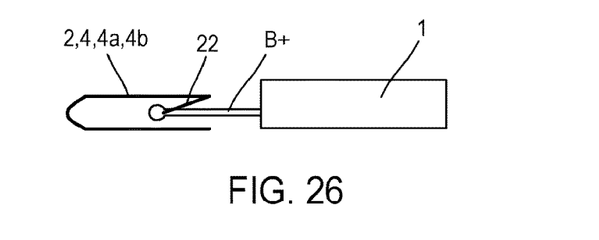
FIG. 26 depicts, in a perspective and plan view, an example of a lug or element forming a connecting clip of an electrochemical assembly module 10 according to the invention, comprising a folded form in the form of a folded tongue.

A second solution consists of advantageously using on the sides of the clip 4, 4a, 4b or 2 a fold form 22 giving rise to a natural spring holding the cell 1 under traction. The fold form 22 may in particular be a folded tongue. The terminal B+ or B− must however have a form enabling it to be pulled by said fold form 22 of the clip 4, 4a, 4b or 2, said terminal B+ or B− then preferably having a curved form.

FIG. 26 depicts, in a perspective and plan view, an example of a lug 2 or element forming a connecting clip 4, 4a, 4b comprising a fold form 22 in the form of a folded tongue. The cell 1 moreover has a positive terminal B+ that is curved in shape.

The positive B+ or negative B− terminal of each elementary electrochemical cell 1 may be of any form, in particular flat or cylindrical. It advantageously clads the gas electrode at the end of a cell 1 over its entire width. The form of the terminal B+ or B− advantageously corresponds to the Z shape of the clip 4, 4a, 4b to allow optimum connection.

Naturally the invention is not limited to the example embodiments that have just been described. Various modifications may be made thereto by a person skilled in the art.

The expression "comprising a" must be understood as being synonymous with "comprising at least one", unless the contrary is specified.

The invention claimed is:

1. An electrochemical assembly module of an energy storage system, comprising:
   an assembly of a plurality of elementary electrochemical cells with a gas electrode, the assembly comprising:
   a plurality of lugs associated respectively with the plurality of elementary electrochemical cells, the lugs being connected together by a connecting holder and receiving terminals of the elementary electrochemical cells so that the terminals are all electrically connected together by the connecting holder,
   a plurality of elements forming connecting clips each receiving at least two terminals of at least two elementary electrochemical cells so that the at least two terminals are electrically connected to each other by the element forming a connecting clip that is associated therewith,
   wherein the elementary electrochemical cells are cells with a double gas electrode.

2. A module according to claim 1, wherein the elementary electrochemical cells are disposed in a zigzag in the electrochemical assembly module.

3. A module according to claim 1, wherein the connecting holder comprises an output terminal of the electrochemical assembly module.

4. A module according to claim 1, wherein the elements forming connecting clips are in a form of a double Z clip.

5. A module according to claim 1, wherein the elementary electrochemical cells are mounted in parallel in the electrochemical assembly module.

6. A module according to claim 5, wherein the lugs receive the terminals with same polarity of the elementary electrochemical cells and the elements forming the connecting clips each receive at least two terminals with same polarity, opposite to the polarity of the terminals of the elementary electrochemical cells received in the lugs.

7. A Module according to claim 5, wherein the elements forming connecting clips are electrically connected together by devices connecting the elements forming connection clips.

8. A module according to claim 5, wherein height of the elements forming connecting clips is greater than height of the elementary electrochemical cells.

9. A module according to claim 5, wherein at least one element forming a connecting clip is electrically connected to an output terminal of the elements forming connecting clips.

10. A module according to claim 1, wherein the elementary electrochemical cells are mounted in series in the electrochemical assembly module.

11. A module according to claim 10, wherein the elements forming connecting clips comprise a first group of first elements forming connecting clips and a second group of second elements forming connecting clips, the first elements forming connecting clips electrically connecting the terminals of two elementary electrochemical cells to form pairs of elementary electrochemical cells, and the second elements forming connecting clips electrically connecting the terminals of two elementary electrochemical cells belonging respectively to two separate pairs of elementary electrochemical cells.

12. A module according to claim 11, wherein the first elements forming connecting clips and the second elements forming connecting clips comprise respectively first and second insulating parts to allow electrical connection only between the elementary electrochemical cells that they connect together respectively.

13. A module according to claim 11, wherein the second elements forming connecting clips are each interposed between a terminal of an elementary electrochemical cell of a first pair of elementary electrochemical cells, paired by a first element forming a connecting clip, and the corresponding lug of the elementary electrochemical cell, and between a terminal of another elementary electrochemical cell of a second pair of elementary electrochemical cells, separate from the first pair, paired by a first element forming a connecting clip, and the corresponding lug of the other elementary electrochemical cell.

14. A method for producing an electrochemical assembly module according to claim 1.

15. A module according to claim 1, wherein the elementary electrochemical cells each comprise a positive terminal and a negative terminal, each situated at an opposite end of the elementary electrochemical cell, on a side of the elementary electrochemical cell different from the one or ones where the gas electrode or electrodes are situated.

16. A module according to claim 15, wherein each positive or negative terminal of an elementary electrochemical cell is disposed over an entire width of the elementary electrochemical cell.

17. A module according to claim 15, wherein the positive terminal and/or the negative terminal of each elementary electrochemical cell dads the gas electrode associated with an end of the elementary electrochemical cell, over its entire width.

18. A module according to claim 1, further comprising a top part and a bottom part of a housing including forms configured to insertion and holding of the elements forming connecting clips.

19. A module according to claim 1, wherein each element forming a connecting clip is in a form of a single slender block.

20. A module according to claim 1, wherein each element forming a connecting clip comprises plural gripping claws for receiving an associated elementary electrochemical cell.

21. A module according to claim 1, wherein the lugs and/or the elements forming connecting clips are in a form of a clip having on each side a complementary shape to enable an elementary electrochemical cell to be gripped.

22. A module according to claim 1, wherein each lug and/or each element forming a connecting clip includes a fold form to enable an elementary electrochemical cell to be gripped.

23. An energy storage system, comprising an assembly of a plurality of electrochemical modules according to claim 1.

24. A method according to claim 14, further comprising, for a first element forming a connecting clip used for a mounting of the elementary electrochemical cells in series, covering the sheet with a deposit of an insulating material to form an insulating part of the first element forming a connecting clip, before folding of the strip.

25. A method according to claim 24, comprising producing an element forming a connecting clip from a sheet cut in a strip, the strip next being folded to give its final form to the element forming a connecting clip.

* * * * *